March 17, 1959 W. V. HARGREAVES, JR 2,878,377

FREQUENCY MODULATION RECEIVER HISS-RESPONSIVE SQUELCH CIRCUIT MADE INEFFECTIVE BY EXCESS DEVIATION AUDIO PEAKS

Filed May 31, 1955 2 Sheets-Sheet 1

INVENTOR.
WILLIAM V. HARGREAVES, JR.
BY Darby & Darby
ATTORNEYS

March 17, 1959 W. V. HARGREAVES, JR 2,878,377

FREQUENCY MODULATION RECEIVER HISS-RESPONSIVE SQUELCH CIRCUIT MADE INEFFECTIVE BY EXCESS DEVIATION AUDIO PEAKS

Filed May 31, 1955 2 Sheets-Sheet 2

INVENTOR.
WILLIAM V. HARGREAVES, JR.
BY Darby + Darby
ATTORNEYS 2,878,377

FREQUENCY MODULATION RECEIVER HISS-RESPONSIVE SQUELCH CIRCUIT MADE INEFFECTIVE BY EXCESS DEVIATION AUDIO PEAKS

William Vernon Hargreaves, Jr., East Paterson, N. J., assignor to Allen B. Du Mont Laboratories, Inc., Clifton, N. J., a corporation of Delaware Application May 31, 1955, Serial No. 511,985

13 Claims. (Cl. 250—20)

Figures 1, 2:
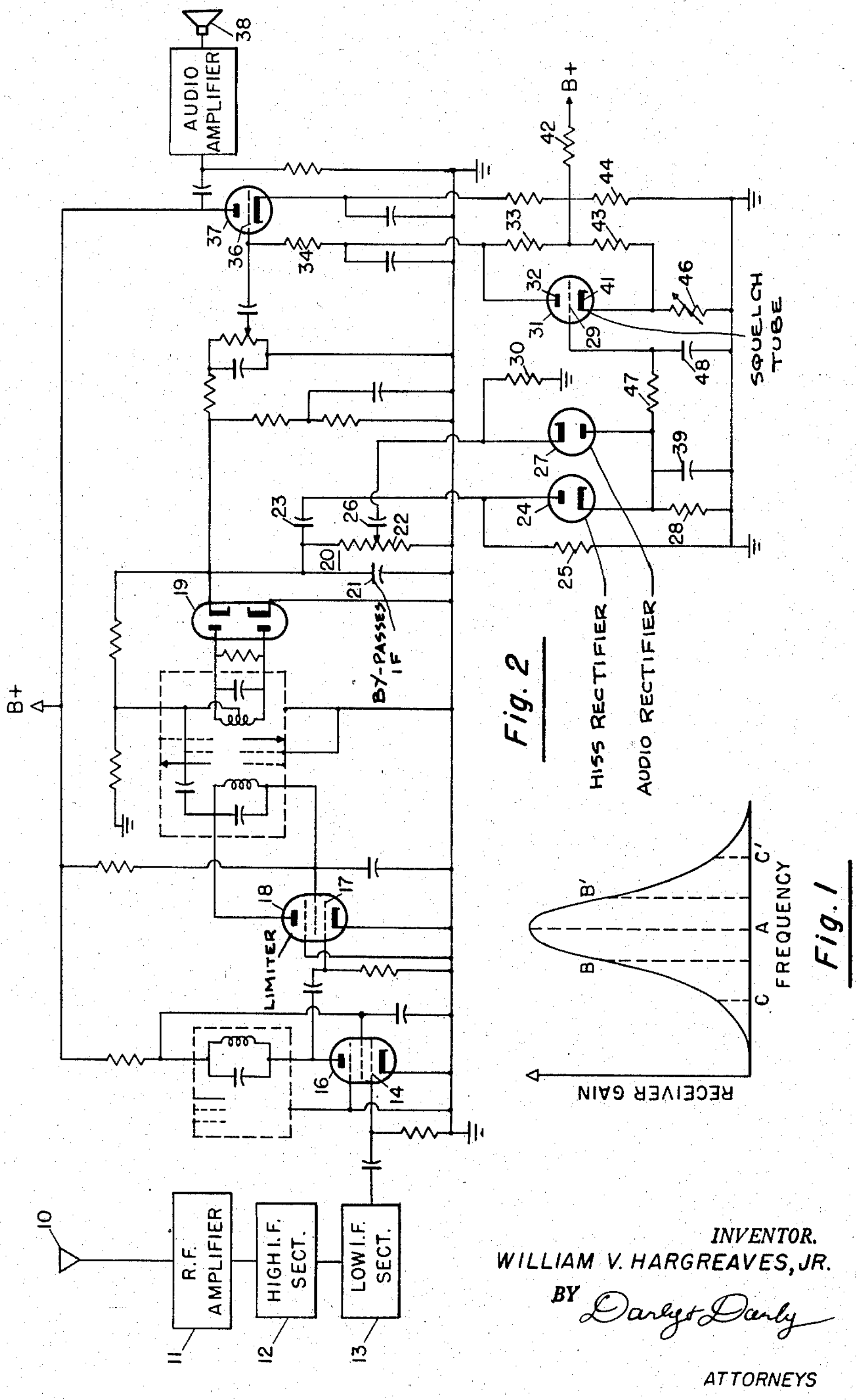

This invention relates to squelch circuits and more particularly to a squelch circuit which eliminates squelch clipping.

The field of two-way, mobile communications has become increasingly important in the past few years, especially in civil defense and police and fire networks, etc., where one or more of the stations is required to be constantly moving and therefore is at varying distances from the transmitter during periods of transmission. In this connection, frequency modulated equipment is almost universally used due to the inherent advantages such as static free reception, clarity of signal, etc.

To regulate the use of this field of communication, the Federal Communications Commission assigns specific frequencies and sets the bandwidth of the modulated carrier to a 30 kilocycle bandwidth, i. e., 15 kilocycles on either side of the assigned carrier frequency.

During the early stages of the growth of this field there were so few requests for frequency allocations that the Commission was able to assign frequencies that were widely separated. Until recently, frequency modulation transmitters did not contain circuitry which limited the bandwidth to the permitted value. Therefore, signals from such non-limited transmitters often deviated more than the permitted range of ±15 kilocycles, resulting in transmitter "over-deviation."

With increased demands for frequency allocations, and with the limited spectrum reserved for mobile equipment, the Commission must now assign adjacent frequencies to neighboring municipalities or counties for their nets. This being the case, the disadvantages of transmitter "over-deviation" became more obvious and more objectionable and required stringent control by the Commission. It is now required that all new equipment be severely restricted to the allowable 30 kilocycle bandwidth.

However, many old transmitters are still in use and the combination of transmitters capable of "over-deviation" with new 30 kilocycle "narrow-band" receivers, subject the listener to an undesirable phenomenon known as "squelch-clipping."

In order to more clearly define this term, it will be helpful to discuss the techniques and various conditions which may exist in mobile communications.

In condition I, the transmitter is quiescent or off the air completely. This condition exists between messages. During this period the receiver is on, and is tuned to the carrier frequency but receives no signal. Due to the extremely high gain of the tubes in its "front-end" the receiver develops a sound described as "hiss," which would always be present at the loudspeaker during the quiescent state of the transmitter. Since the hiss may tend to become objectionable if one has to listen to it constantly, a squelch circuit is utilized to mute the loudspeaker by cutting off the audio tube during high levels of hiss.

Condition II is in effect when the transmitter operator is ready to speak into a microphone. He puts his station on the air by first transmitting an unmodulated carrier of the frequency assigned by the Federal Communications Commission. The receiver which is tuned to this frequency, receives the carrier. The inherent operation of the receiver is such that the hiss level is reduced in proportion to the strength of the received carrier. A carrier of high signal strength such as may be received from a high power transmitter or a transmitter that is close by, will appreciably reduce the hiss in the receiver; by the same token it follows that a carrier of low signal strength such as may be received from a low power transmitter or a transmitter that is distant, will also result in a decrease in hiss but not to the point where the hiss is virtually eliminated as is the case with a carrier of high signal strength. Any appreciable decrease in hiss, deactivates the squelch circuit, an operation known as "awakening" the receiver. The receiver is now ready to receive the transmitted message.

Condition III occurs when the operator speaks into his microphone. Frequency modulation of the carrier takes place, and the awakened receiver reproduces the message at its loud-speaker.

In frequency modulation, the message spoken into the microphone causes the frequency of the carrier to deviate about the assigned frequency in direct proportion to the loudness of the spoken words. In older transmitters that do not have deviation limiting circuitry, extreme loudness will cause deviation beyond the 15 kilocycles permitted, thereby producing condition IV.

During condition IV, periods of transmitter overdeviation, i. e., frequencies beyond the passband of the receiver, are produced. Since a narrow-band receiver is not responsive to these "peak" frequencies, the receiver acts as though there were no signal present, i. e., hiss tends to reappear during periods of over-deviation, the squelch circuit thereupon mutes the loudspeaker, and the listener hears a message that is instantaneously cut off, or clipped. At the very next instant the message loudness or deviation may decrease, thus awakening the receiver to terminate the clipping action and again reproduce the message.

The above clipping action is repetitious and annoying and in some instances may be dangerous. In an emergency when the operator desires most to be heard, the higher volume of his voice may cause over-deviation with the resultant squelch clipping, thus making the message unintelligible. Another possible source of squelch clipping is the transmission of high pitched sounds. The transmitter usually includes a pre-emphasis circuit which tends to cause the transmitter to deviate disproportionately for high pitched sounds, which in some instances may have the same effect as excessive loudness.

A comparable phenomenon known as "squelch-flutter" appears when the receiver is moving among tall buildings or is passing under bridges. In a situation such as this, it has been found that the signal is weak in certain areas. When the receiver gets such a weak signal, or in some instances no signal, hiss tends to reappear, and the squelch circuit mutes the loudspeaker.

One disadvantage of prior art squelch circuits was that they often utilized noise amplifiers and filters, thereby forming a circuit wherein a failure of the noise amplifier tube disabled the entire receiver.

When mobile equipment using prior art squelch circuits were installed in automobiles, it was found that the operation of the squelch circuits varied with fluctuations in the load on the car battery. This resulted in a condition wherein the listener anticipated messages, but battery load fluctuations caused the squelch circuit to remain operative, thus muting the loudspeaker so that messages were not reproduced.

Still another disadvantage of prior art squelch circuits was that when transferring a receiver from a car having a grounded negative terminal battery to a car utilizing a grounded positive terminal battery different heater-tocathode leakage effects on the tubes of the squelch circuit would be introduced, thus changing the squelch threshold.

Therefore, the principal object of the instant invention is to provide an improved squelch circuit.

Another object is to provide a squelch circuit which eliminates squelch clipping.

A further object is to provide a squelch circuit which eliminates squelch flutter.

Still another object is to provide a squelch circuit which has a maximum squelch sensitivity which is adjustable over a wide range.

A further object is to provide a squelch circuit wherein tube failure in the squelch circuit will not disable the entire receiver.

A still further object is to provide a squelch circuit wherein fluctuations of the supply potential or reversal of the supply polarity does not adversely affect squelch operation.

In general, the squelch circuit herein disclosed mutes the loudspeaker during high levels of hiss but keeps the receiver awake by the action of a deviation-compensation tube during transmitter deviation in excess of the passband of the receiver. Appropriate signals either mute or awaken the receiver in cooperation with controls which determine the sensitivity of the squelch circuit.

Figure 3:
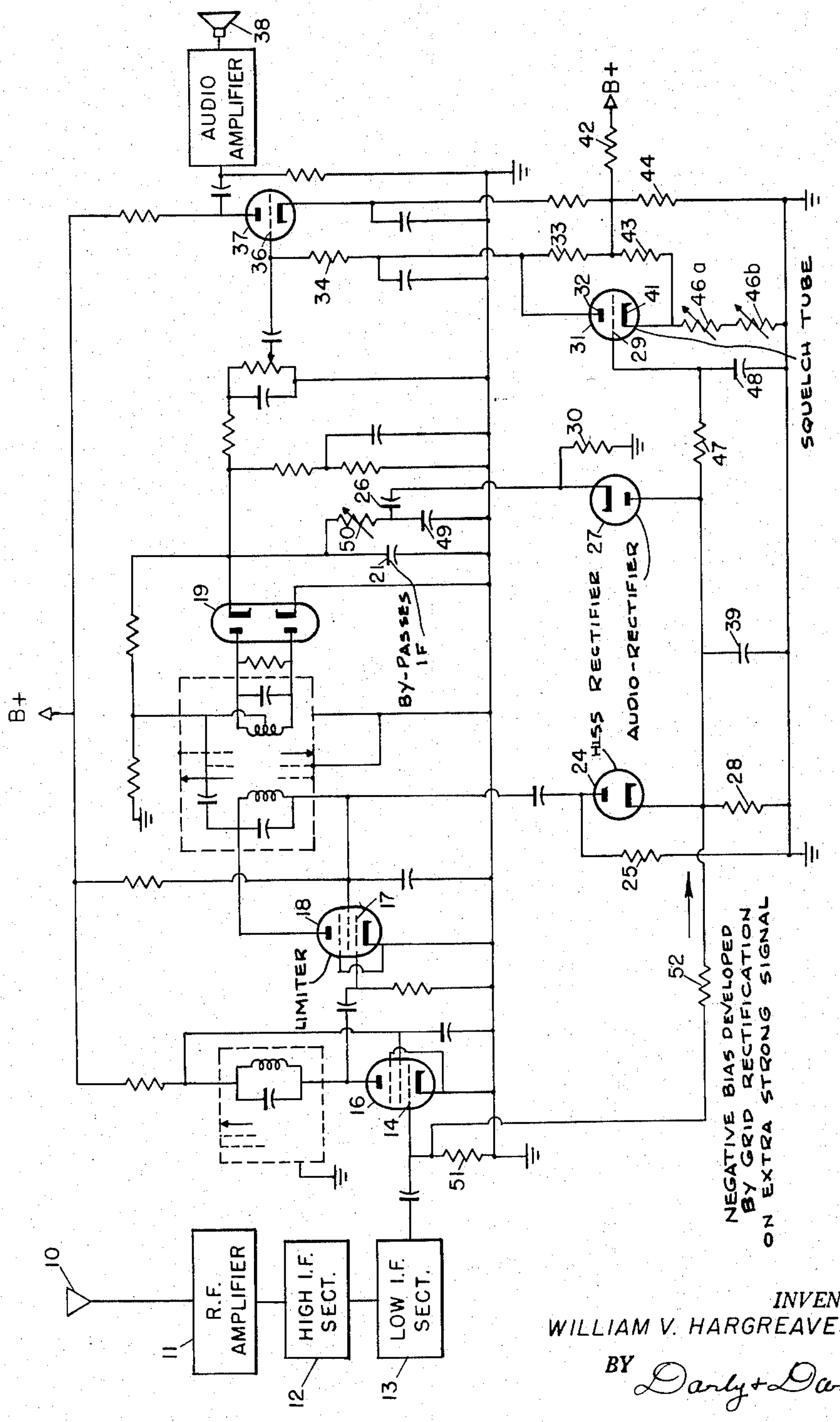

The foregoing objects as well as the operation of the circuit will be better understood from the following specification taken in conjunction with the drawings, of which, Figure 1 is a curve showing the gain of the receiver as related to frequency;

Figure 2 illustrates in block and schematic form a frequency modulated receiver utilizing the instant invention; and Figure 3 illustrates an improved embodiment of the squelch circuit herein disclosed.

To facilitate explanation of the circuit's operation, the following terms will be used. "Upvolt" will signify an increase in potential; conversely "downvolt" will designate a lowering of potential. Neither term indicates that the potentials are necessarily positive, negative, or undergo a change in sign.

Referring now to Figure 1, point A represents the carrier frequency as assigned by the Federal Communications Commission. Points B and B′ represent the limits of permissible deviation, namely, ±15 kilocycles to either side of frequency A. Other points such as C, C′, beyond the limits of B, B′, represent deviation by the transmitter which produces frequencies in excess of the passband of the receiver.

Hiss, which alone controlled the prior art squelch circuits, increases at lower values of gain and would tend to appear at and beyond points B and B′. Also during periods of over-deviation, as the carrier swings from C to C′ and back, there will be alternate periods of muting and awakening as the frequency deviates from a point beyond the passband of the receiver into the passband. Further, while the receiver passes between or under steel structures, low values of signal strength will occur which also tend to mute the loudspeaker. All of these conditions introduce intermittency of receiver response. The deviation compensation circuitry herein disclosed prevents this and obviates both squelch-flutter and squelch-clipping during periods of transmitter over deviation.

Figure 2 is a combination block and schematic diagram of an FM receiver showing one embodiment of my invention. In this embodiment, the incoming signal is picked up by antenna 10, and passes successively through radio frequency amplifier 11, high intermediate frequency section 12, and low intermediate frequency section 13 before being applied to grid 17 of second limiter tube 18 whose output is applied to discriminator tube 19.

These stages function in a manner well known to those skilled in the art and do not require further explanation.

The output of discriminator tube 19 varies with previously described conditions I through IV of the transmitter as follows: during condition I, while the transmitter is quiescent, the output of discriminator tube 19 consists of intermediate frequencies and hiss frequencies. It will be understood that hiss is actually the noise emitted by the loudspeaker, while hiss voltage would more properly define the electrical signal developed within the circuit. To those skilled in the art, the word hiss is used to indicate both.

During condition II, the period when the unmodulated carrier frequency is being transmitted, the I. F. and hiss voltages are present in the discriminator output except that the hiss voltage has been reduced by the presence of the carrier.

For condition III, when a message is being transmitted, in addition to the above voltages a "recovered-audio" voltage which is representative of the message, is also present in the output of discriminator tube 19.

For condition IV there are periods of high hiss voltage and low recovered audio voltage, which alternate with periods of low hiss voltage and high recovered audio voltage.

Referring again to Figure 2, the instantaneous output from discriminator-tube 19 is impressed on an RC frequency separating network 20 which includes capacitor 21 and adjustable voltage divider 22. The value of capacitor 21 is selected to bypass the intermediate frequencies to ground, but offer a high impedance path to other frequencies. Capacitor 23 is of a value which tends to block the audio frequencies but pass the hiss frequencies to hiss rectifier tube 24. Conversely, the combined action of voltage divider 22 and capacitor 26 tends to attenuate and block the hiss frequencies while passing the audio frequencies to deviation compensation tube 27.

In this way the intermediate, hiss, and audio frequencies are separated. An alternating hiss voltage is developed across resistor 25 and is applied to hiss rectifier tube 24. Voltage divider 22 provides a means for adjustable values of recovered audio voltage to be developed across resistor 30 and applied to deviation compensation tube 27.

Tubes 24 and 27 are connected in opposite polarities to ground through a common resistor 28. Thus, hiss rectifier tube 24 passes the positive peaks of hiss voltage, while deviation compensation tube 27 passes the negative portions of the recovered audio voltage. The net current flow through resistor 28 may therefore be in a positive or in a negative direction, and the resultant IR drop across resistor 28 produces a voltage on grid 29 of squelch control tube 31.

The circuit operates as follows. During condition I, when the transmitter is quiescent, the highest level of hiss voltage occurs and appears at the output of discriminator tube 19. This causes hiss rectifier tube 24 and resistor 28 to conduct heavily to charge capacitor 39 to its maximum positive potential. This positive potential is applied to control grid 29 of squelch control tube 31 causing it to become conductive. The current through tube 31 flows to B+ through load resistor 33 causing anode 32 to be downvolted. The negative going voltage is then applied through resistor 34 to grid 36 of audio tube 37, thus cutting off tube 37 to mute the loudspeaker.

During condition II, an unmodulated carrier is being transmitted. The output of discriminator tube 19 now contains a lower level of hiss voltage which causes a reduced conductivity through hiss rectifier tube 24 and resistor 28, downvolting capacitor 39 from its maximum positive potential. The downvolted potential of capacitor 39 is applied to grid 29 thereby cutting off squelch control tube 31. The current through tube 31 decreases, causing anode 32 to be upvolted. This positive going signal is applied through resistor 34 to grid 36 of audio tube 37, thus allowing tube 37 to become conductive and awaken the receiver.

For condition III a message is being transmitted, and the output of discriminator tube 19 now includes a "recovered-audio." This is passed through appropriate circuitry to the awakened loudspeaker 38, and through the previously described circuitry to deviation compensation tube 27 which acts to further discharge capacitor 39, assuring cutoff of squelch control tube 31.

During condition IV, deviation by the transmitter in excess of the passband of the receiver or passage of the receiver to areas of weak signals, the hiss level tends to increase thereby upvolting capacitor 39. However, the recovered audio acting through deviation compensation tube 27 tends to keep capacitor 39 downvolted. The net result is that squelch control tube 31 remains cut off, preventing squelch clipping or flutter.

Ordinarily, when the communication from the transmitter is ended, the transmitter goes off the air. Hiss immediately tends to develop in the receiver, and in response to this the squelch circuit becomes operative to mute the speaker. The listener may be in doubt whether the transmitter operator is actually finished speaking or whether he has something else to add. To aid the listener in this situation, the receiver of Figure 2 has an integrating network consisting of resistor 47 and capacitor 48 inserted into the circuit of grid 29 of squelch control tube 31. Instead of the squelch circuit becoming immediately operative on the termination of the transmitted carrier, this network introduces a momentary delay so that just a short burst of hiss appears at the speaker. The listener is thus advised that the transmitter is off the air and that communication is definitely at an end.

The squelch circuit incorporated into the receiver has still another function.

It will be seen that the potential at cathode 41 of squelch control tube 31 is determined by the voltage divider formed by resistors 42, 43, 44 and variable resistor 46. Since the point at which tube 31 conducts is determined by the relative voltages at grid 29 and cathode 41, the point of conductivity may be controlled by variable resistor 46 which is known as the "squelch-sensitivity" control. At a particular setting of the squelch sensitivity control, the relative potentials at grid 29 and cathode 41 place tube 31 at the threshold between conductivity and non-conductivity which setting is identified as the "threshold setting."

At this setting, any downvolting of grid 29 will lessen the conductivity or cut off squelch control tube 31 and awaken the receiver. Thus a signal from a weak or distant transmitter can be received. As the value of squelch sensitivity control is reduced to values below the threshold setting, only stronger stations will be received.

Figure 3 illustrates an improved embodiment of the disclosed squelch circuit. The basic circuit is the same as that previously shown, and similar reference characters have been used wherever possible.

In Figure 2 some of the hiss frequencies were present, although attenuated, in voltage divider 22 at the point where the audio voltage was taken off, and so found their way through deviation compensation tube 27 to resistor 28 where the negative peaks tended to counteract the positive peaks through hiss rectifier 24.

The circuit of Figure 3 avoids this disadvantage and effects better separation of the hiss and audio voltages, thereby achieving improved operation of the squelch circuit herein disclosed. In this embodiment, the hiss voltage for rectifier tube 24 is obtained from the screen grid of second limiter tube 18. In order to better utilize the recovered audio voltage, and since less hiss voltage is present in the recovered audio voltage, deviation compensation tube 27 may be connected to the output of discriminator tube 19 through an R. C. network consisting of resistor 48 and capacitor 49. Any hiss frequencies at this point are unnecessary, and are bypassed to ground by capacitor 49 thereby permitting a more effectual use of the recovered audio voltage. In some instances, it may even be desirable to connect deviation compensation tube 27 directly to one of the audio stages.

It was briefly stated in connection with Figure 2 that the squelch sensitivity control could be set so that the receiver awakened to strong signals and yet remained mute to weak signals. A fuller discussion is now in order. It will be recalled that for condition I, the absence of a a signal, the hiss level was high, and capacitor 29 was charged up to a maximum positive potential which potential was then applied to grid 29 of squelch control tube 31. Upon return of a signal the hiss level was lowered thereby downvolting grid 29 toward cut off. The threshold setting of squelch-sensitivity control 46 was defined as that point where the potential relationship between grid 29 and cathode 41 of tube 31 was such that tube 31 was on the threshold between conductivity and non-conductivity.

At the threshold setting, squelch control tube 31 could be cut off by a slight downvolting of grid 29. This magnitude of downvolting could be accomplished by weak signals. Thus at the threshold setting, the receiver could be awakened by signals which ranged from weak to very strong.

If the value of squelch control 46 is reduced, cutoff of squelch control tube 31 would require more grid downvolting than at the threshold setting. This magnitude of downvolting would not be accomplished by the hiss suppression caused by a weak signal but would be achieved by the hiss suppression of signals of moderate strength. Thus, this setting of the squelch sensitivity control will keep the set mute to weak signals, but will permit it to be awakened by signals ranging from moderate to very strong.

If the resistance of squelch sensitivity control 46 is further decreased, a point will be reached where even complete hiss suppression, such as may be caused by strong or very strong signals, will barely downvolt grid 29 enough to cut off the tube. This setting is known as the maximum squelch sensitivity setting. This position for the squelch sensitivity control will cause the set to remain mute for signals ranging from weak to strong, and will permit the set to be awakened only by strong and very strong signals. However, the receiver at this setting of the squelch sensitivity control cannot differentiate between strong signals which may be received from unwanted transmitters and very strong signals which may be received from the desired transmitter.

If the resistance of squelch sensitivity control 46 is reduced beyond the aforementioned maximum squelch sensitivity setting cathode 41 will be downvolted to such an extent that even complete hiss suppression that may be caused by strong or very strong signals, will not downvolt grid 29 enough to cut off squelch control tube 31. The receiver will therefore remain mute to signals of all strengths, a condition known as "squelch lockout." This condition is undesirable because the listener will be unable to receive messages from even his own transmitter.

In the improved circuit of Figure 3, squelch sensitivity control has been divided into two separate variable resistors 46*a* and 46*b*. Control 46*a* may be a screwdriver adjustment within the set while 46*b* may be adjusted by the listener to cope with local conditions. The value of 46*a* may be pre-set to avoid the possibility of squelch lockout.

With the circuit thus far described the receiver cannot separate the strong from the very strong signals. This may be accomplished however by connecting resistor 52 between the ungrounded end of resistor 28 and grid 14 of first limiter tube 16. During reception of a carrier of high signal strength, grid 14 draws current in proportion to the strength of the received carrier, thereby developing a negative voltage across resistor 51. This negative voltage is applied through resistor 52 to grid 29 of squelch control tube 31. If the squelch sensitivity control were positioned for squelch lockout, the negative voltage developed across resistor 51 by a strong or a very strong signal would be sufficient to downvolt grid 29 to cut off, thereby awakening the set which would have been mute except for this connection. The resistance of the squelch sensitivity control may now be reduced even further, to the point where the negative voltage developed by an undesired strong signal will not awaken the set, and yet the negative voltage developed by a very strong signal from the desired transmitter will awaken the set.

This novel connection has therefore extended the range of the squelch sensitivity and allows the receiver to differentiate even very strong signals from all others.

Thus, for weak signals practically no voltage is developed across resistor 51, and only hiss suppression and the setting of squelch sensitivity control determine the point of awakening. For strong signals, even complete hiss suppression is not sufficient to cut off tube 31 and the negative voltage developed across resistor 51 determines the point of awakening.

It will be noted that neither hiss tube 24 nor deviation compensation tube 27 requires any connection to B+. The sensitivity and operation of the squelch circuit is therefore largely independent of fluctuations of the battery voltage. In addition should the filament of hiss tube 24 become inoperative, the receiver will continue to operate except that hiss would be present at the speaker. Furthermore if deviation compensation tube 27 should become inoperative, the receiver will also continue to operate although without the squelch clipping feature herein disclosed. In most prior art circuits the failure of any of the tubes in the squelch circuit completely disables the receiver.

It will be understood by those skilled in the art that various other modifications in either embodiment herein presented are possible without departing from the spirit of the present invention or from the scope of my claims.

What is claimed is:

1. A squelch control circuit for frequency modulated radio receivers, comprising, in combination, an audio frequency amplifier tube having a control electrode, a hiss rectifier, means for applying a hiss frequency voltage to said rectifier, an electron tube having cathode, anode and control electrodes, a resistance-capacitance network connected to the output of said hiss rectifier, means for applying the rectified voltage from said hiss rectifier to said resistance-capacitance network, means for applying the average voltage present across said resistance-capacitance network to the grid of said electron tube, a voltage divider network connected to said electron tube for determining the voltage applied to said electron tube cathode, and means for applying voltage variations appearing in the output of said electron tube to said control electrode of said audio frequency amplifier tube of the radio receiver to thereby bias said amplifier tube beyond cutoff when said averaged hiss voltage exceeds a predetermined negative value as determined by said voltage divider network.

2. In a squelch control circuit for frequency modulated radio receivers, an audio amplifier tube having a control grid, a hiss rectifier, means for applying a hiss frequency voltage derived from the signal channel of the receiver ahead of the audio amplifier of the receiver to said rectifier, an electron tube having cathode, anode and control electrodes, means for applying the output of said hiss rectifier to the cathode-control electrode circuit of said electron tube, a voltage divider comprising an adjustable resistor for determining the voltage applied to the cathode of said electron tube, and means for applying the output of said electron tube to said control electrode of said audio amplifier tube of the radio receiver to bias said amplifier tube to cutoff when the net negative voltage of said electron tube grid with respect to its cathode exceeds a predetermined value as determined by the setting of said adjustable resistor.

3. A squelch control circuit for frequency modulated radio receivers, comprising, in combination, a hiss rectifier, means for applying a hiss frequency voltage derived from the signal channel ahead of the audio amplifier of the receiver to said rectifier, an electron tube having cathode, anode and control electrodes, means for applying the rectified output from said hiss rectifier to the cathode-control electrode circuit of said electron tube, a second rectifier, means for supplying an audio frequency voltage derived from said signal channel of the receiver ahead of the audio amplifier to said second rectifier, means for supplying the rectified voltage from said second rectifier to the cathode-control electrode circuit of said electron tube in opposition to the voltage from said first rectifier, a voltage divider network comprising an adjustable resistor for determining the voltage applied to the cathode of said electron tube, and means for applying the output of said electron tube to said control electrode of said audio amplifier tube to bias said amplifier tube to cutoff when the net negative voltage of said electron tube grid with respect to its cathode exceeds a predetermined value as determined by the setting of said adjustable resistor whereby said rectified hiss voltage tends to mute said receiver and said audio voltage tends to awaken said receiver.

4. A squelch control circuit for frequency modulated radio receivers, comprising, in combination, a hiss rectifier, a filter network connected to the output of the second limiter tube of a frequency modulated receiver, means for applying a voltage at hiss frequency derived from the second limiter tube to said hiss rectifier, a squelch control amplifier tube having cathode, anode and control electrodes, means for applying the rectified output of said hiss rectifier to the cathode-control electrode circuit of said electron tube, a second rectifier, a filter network connected to the discriminator tube of the frequency modulated radio receiver, said filter network being adapted to pass audio frequency signals, means applying said audio frequency signals to said second rectifier, means supplying said rectified audio frequency from said second rectifier to the cathode-control electrode circuit of said electron tube, said rectified voltage being of opposite polarity to that supplied to said cathode-control electrode circuit by said first rectifier, and means for applying the output of said squelch control tube to an audio frequency amplifier of the radio receiver to bias said amplifier to cutoff when the voltage applied to said grid exceeds a predetermined value whereby the radio receiver is muted during periods when no carrier signal is received and is awakened during periods of reception of carrier signal, said second rectifier supplying a voltage which prevents muting of the receiver during the reception of frequencies outside the normal acceptance band of the receiver.

5. In a frequency modulation radio receiver, a hiss reducing circuit to disable the audio amplifier of the receiver only during the absence of a received signal, said hiss reducing circuit comprising a hiss rectifier connected to the signal channel at a point ahead of the audio amplifier to pick up hiss signals and to generate a rectified signal in response thereto, a squelch control amplifier comprising at least a cathode and input and output electrodes, said squelch control amplifier input electrode connected to said rectifier to be energized by said rectified signal, a tube in the audio amplifier connected to said output electrode of said squelch control amplifier to be biased to non-conductive condition thereby when said squelch control amplifier is energized by said rectified signal, a deviation compensation rectifier connected to said signal channel at a point ahead of the audio amplifier to be energized by audio signals during the reception of frequency modulated transmissions, a connection between said deviation compensation rectifier and said squelch control amplifier to control the operation of said squelch control amplifier during reception of frequency modulated transmissions, and voltage divider means comprising an adjustable resistor for adjusting the bias on said squelch control amplifier cathode to thereby set the threshold value of received frequency modulated transmissions at which the audio amplifier will conduct.

6. In a frequency modulation radio receiver, a hiss reducing circuit to disable the audio amplifier of the receiver only during the absence of a received signal, said hiss reducing circuit comprising a hiss rectifier connected to the signal channel at a point ahead of the audio amplifier to pick up hiss signals and to generate a rectified signal in response thereto, a squelch control amplifier comprising at least a cathode and input and output electrodes, said squelch control amplifier input electrode connected to said rectifier to be energized by said rectified signal, a tube in the audio amplifier connected to said output electrode of said squelch control amplifier to be biased to non-conductive condition thereby when said squelch control amplifier is energized by said rectified signal, a deviation compensation rectifier connected to said signal channel at a point ahead of the audio amplifier to be energized by audio signals during the reception of frequency modulated transmissions, a connection between said deviation compensation rectifier and said squelch control amplifier to control the operation of said squelch control amplifier during reception of frequency modulated transmissions, a voltage divider network comprising an adjustable resistor for adjusting the bias on said squelch control amplifier cathode to thereby set the threshold value of received frequency modulated transmissions at which the audio amplifier will conduct, and a connection from said squelch control amplifier to said signal channel at a point ahead of the audio amplifier to apply additional bias voltage to said squelch control amplifier during reception of frequency modulated transmissions to increase the effective range of threshold setting of said adjusting means to thereby effect conduction of the audio amplifier only upon reception of frequency modulated signals of predetermined strength.

7. In a frequency modulation radio receiver, a hiss reducing circuit to disable the audio amplifier of the receiver only during the absence of a received signal, said hiss reducing circuit comprising a hiss rectifier connected to a limiter stage of the receiver to pick up hiss signals and to generate a rectified signal in response thereto, a squelch control amplifier to be energized by said rectified signals, a tube in the audio amplifier of the receiver connected to an output circuit of said squelch control amplifier to be biased to non-conduction thereby when said squelch control amplifier is energized by said rectified signal, a deviation compensation rectifier connected to the signal channel of the receiver at a point ahead of the audio amplifier to be energized by audio frequency signals during the reception of frequency modulated transmissions and a connection between said deviation compensation rectifier and said squelch control amplifier to control the operation of said squelch control amplifier during the reception of frequency modulation transmissions.

8. In a frequency modulation receiver, a hiss reducing circuit to disable the audio amplifier of the receiver only during the absence of a received signal, said hiss reducing circuit comprising a hiss rectifier connected to a signal channel of said receiver at a point ahead of the audio amplifier to pick up hiss signals and to generate a rectified signal in response thereto, a squelch control amplifier connected to said rectifier to be energized by said rectified signal, a tube in the audio amplifier of the receiver connected to an output circuit of said squelch control amplifier to be biased to non-conduction thereby when said squelch control amplifier is energized by said rectified signal, a deviation compensation rectifier connected to the discriminator stage of the radio receiver to be energized by audio signals during the reception of frequency modulated transmissions and a connection between said deviation compensation rectifier and said squelch control amplifier to control the operation of said squelch control amplifier during reception of frequency modulated transmissions.

9. In a frequency modulation radio receiver, a hiss reducing circuit to disable the audio amplifier of the receiver only during the absence of a received signal, said hiss reducing circuit comprising a hiss rectifier connected to a limiter stage of the receiver to pick up hiss signals and to generate a rectified signal in response thereto, a squelch control amplifier to be energized by said rectified signals, a tube in the audio amplifier connected to an output circuit of said squelch control amplifier to be biased to non-conduction thereby when said squelch control amplifier is energized by said rectified signal, a deviation compensation rectifier connected to the discriminator stage of the radio receiver to be energized by audio signals during the reception of frequency modulated transmissions, and a connection between said deviation compensation rectifier and said squelch control amplifier to control the operation of said squelch control amplifier during reception of frequency modulated transmissions.

10. In a frequency modulation radio receiver, a hiss reducing circuit to disable the audio amplifier of the receiver only during the absence of a received signal, said hiss reducing circuit comprising a hiss rectifier connected to limiter stage of the receiver to pick up hiss signals and to generate a rectified signal in response thereto, a squelch control amplifier to be energized by said rectified signals, a tube in said audio amplifier connected to an output circuit of said squelch control amplifier to be biased to non-conduction thereby when said squelch control amplifier is energized by said rectified signal, a deviation compensation rectifier connected to the discriminator stage of the radio receiver to be energized by audio signals during the reception of frequency modulated transmissions, a connection between said deviation compensation rectifier and said squelch control amplifier to control the operation of said squelch control amplifier during reception of frequency modulated transmissions, means for adjusting the bias on said squelch control amplifier to thereby set the threshold value of received frequency modulation signals at which the audio amplifier will conduct, a connection from said squelch control amplifier to a limiter stage of the receiver ahead of the limiter stage to which said hiss rectifier is connected, said connection serving to apply additional bias voltage to said squelch control amplifier during the reception of frequency modulated transmissions to increase the effective range of said threshold adjusting means to thereby effect conduction of the audio amplifier only upon reception of frequency modulated signals of predetermined strength.

11. In a frequency modulation radio receiver, a hiss reducing circuit to disable the audio amplifier of the receiver only during the absence of a received signal, said hiss reducing circuit comprising a hiss amplifier connected to the signal channel of the receiver at a point ahead of the audio amplifier to pick up hiss signals and generate the rectified signal in response thereto, a squelch control electron tube connected to said hiss rectifier to be energized by said rectified hiss signals, a connection from the output of said squelch control tube to the input of the audio amplifier to bias the amplifier to non-conduction, a deviation compensation rectifier connected to said signal channel of the receiver at a point ahead of the audio amplifier to be energized by audio signals during the reception of frequency modulated transmissions, and means connecting said deviation compensation rectifier to said squelch control tube to control said tube and maintain the amplifier energized during reception of frequency modulated transmissions, said deviation compensation rectifier being operable at low signal strengths whereby during momentary frequency deviation of the frequency modulation transmissions beyond the normal acceptance band of the receiver said hiss rectifier is prevented from controlling said control tube to mute the receiver.

12. In a frequency modulation radio receiver, a hiss reducing circuit to disable the audio amplifier of the receiver only during the absence of a received signal, said hiss reducing circuit comprising a hiss amplifier connected to the signal channel of the receiver at a point ahead of the audio amplifier to pick up hiss signals and generate a rectified signal in response thereto, a squelch control electron tube connected to said hiss rectifier to be energized by said rectified hiss signals, a connection from the output of said squelch control tube to the input of the audio amplifier to bias the amplifier to non-conduction, a deviation compensation rectifier connected to said signal channel of the receiver at a point ahead of the audio amplifier to be energized by audio signals during the reception of frequency modulated transmissions, means connecting said deviation compensation rectifier to said squelch control tube to control said tube and maintain the amplifier energized during reception of frequency modulation transmissions, said deviation compensation rectifier being operable at low signal strengths whereby during frequency deviation of the frequency modulation transmissions beyond the normal acceptance band of the receiver said hiss rectifier is prevented from controlling said control tube to mute the receiver, and means for applying an adjustable bias on said squelch control tube, said bias determining the point at which said squelch control tube will operate to cause the audio amplifier to conduct.

13. In a frequency modulation radio receiver, a hiss reducing circuit to disable the audio amplifier of the receiver only during the absence of a received signal, said hiss reducing circuit comprising a hiss amplifier connected to the signal channel of the receiver at a point ahead of the audio amplifier to pick up hiss signals and generate a rectified signal in response thereto, a squelch control electron tube connected to said hiss rectifier to be energized by said rectified hiss signals, a connection from the output of said squelch control tube to the input of the audito amplifier to bias the amplifier to non-conduction, a deviation compensation rectifier connected to said signal channel of the receiver at a point ahead of the audio amplifier to be energized by audio signals during the reception of frequency modulated transmissions, means connecting said deviation compensation rectifier to said squelch control tube to control said tube and maintain the amplifier energized during reception of frequency modulation transmissions, said deviation compensation rectifier being operable at low signal strengths whereby during momentary frequency deviation of frequency modulation transmissions beyond the normal acceptance band of the receiver said hiss rectifier is prevented from controlling said squelch control tube to mute the receiver, means for applying an adjustable bias on said squelch control tube, said bias determining the point at which said squelch control tube will operate to cause the audio amplifier to conduct, and a connection from said squelch control tube to the signal channel of the receiver ahead of the audio amplifier, said connection providing additional bias on the input of said squelch control tube to extend the range of setting and permit said squelch control tube to cause conduction of the audio amplifier only when the frequency modulation signal strength exceeds a desired minimum.

References Cited in the file of this patent

UNITED STATES PATENTS

| | | |
|---|---|---|
| 2,247,085 | Goldman | June 24, 1941 |
| 2,372,934 | Campbell | Apr. 3, 1945 |
| 2,400,948 | Peterson | May 28, 1946 |
| 2,420,518 | Brown | May 13, 1947 |
| 2,589,711 | Lacy | Mar. 18, 1952 |
| 2,770,721 | Clark | Nov. 13, 1956 |